March 26, 1929.  R. R. WIRT  1,706,909
LOCKED WRIST PIN
Filed April 4, 1928
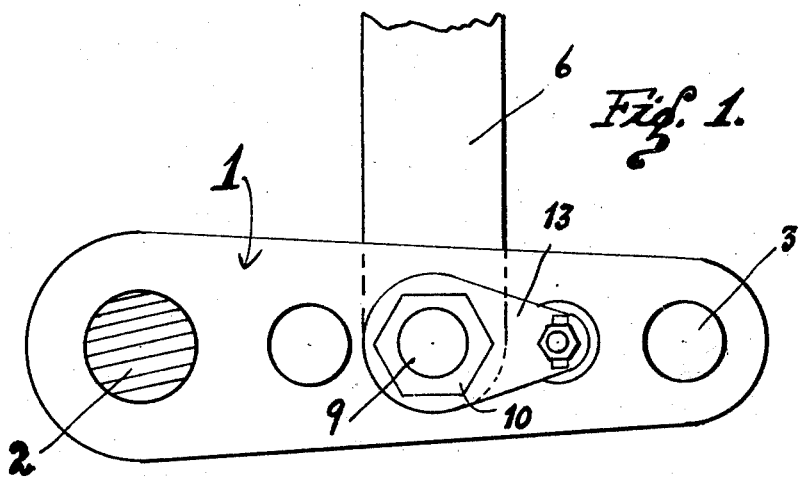
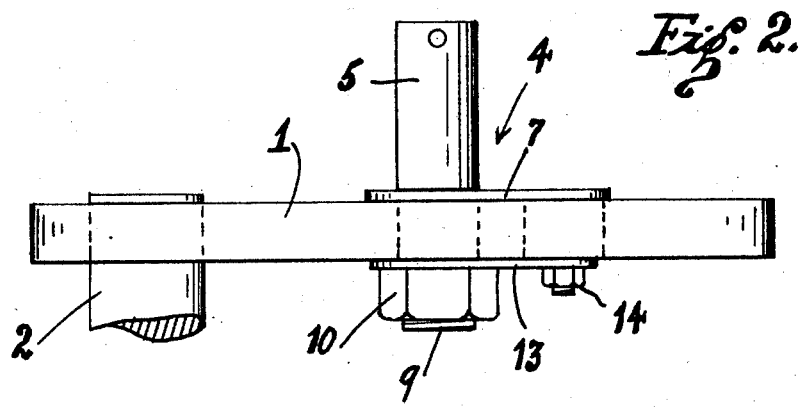
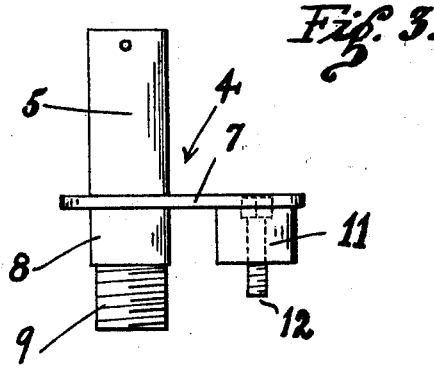
INVENTOR.
RALPH. R. WIRT
BY
ATTORNEY.

Patented Mar. 26, 1929.

1,706,909

UNITED STATES PATENT OFFICE.

RALPH R. WIRT, OF LONG BEACH, CALIFORNIA.

LOCKED WRIST PIN.

Application filed April 4, 1928. Serial No. 267,289.

This invention relates to a pin which is removably mounted in the crank arm of an engine and the connecting rod, which operates the walking beam of an oil well, is journaled on the pin.

An object of my invention is to provide a pin of the character stated which is held against rotary movement when in position on the crank arm.

A further object is to provide a wrist pin in which the locking nut, holding the same in position, is held against unscrewing.

Other objects, advantages, and features of invention may appear from the accompanying drawing, the subjoined detailed description, and the appended claims.

In the drawing:

Fig. 1 is a side elevation of my pin in position on the crank arm.

Fig. 2 is a plan view of the same.

Fig. 3 is a plan view of my pin.

Referring more particularly to the drawing:

The numeral 1 indicates the crank arm of well-known and usual construction, said arm being secured to the shaft 2, which shaft is rotated from any suitable source of power, such as the well-known gas or steam engine used in the pumping of oil wells. The crank arm 1 is provided with a plurality of holes 3 therein, in which my wrist pin 4 is adapted to be mounted, the object of the various holes being to adjust the stroke of the walking beam to suit various conditions.

My wrist pin 4 comprises a trunnion 5 upon which the usual connecting rod 6 is journaled. A plate 7 is preferably integrally formed with the trunnion 5 and is adapted to rest against one side of the crank arm 1, as shown in Figure 2. A circular pin section 8 is provided in alinement with the trunnion 5, said section extending through and fitting in one of the holes 3. Outer threaded section 9 is formed on the section 8 and a nut 10 screws thereon to hold the pin on the crank arm.

At the outer end of the plate 7 I provide a locking trunnion 11 which fits into the next adjacent hole 3, and the trunnion is integrally formed with the plate 7, and thus it will be seen that the pin is effectively held against rotation. A bolt 12 extends through the trunnion 11 and the head is countersunk, as shown in Fig. 3. A locking plate fits over the nut 10 and over the bolt 12, and a nut 14 screws on to the bolt against the lock plate, thus holding the lock plate in position and effectively preventing the rotation of the nut 10.

With the construction above described, a wrist pin is provided which is held against rotation and will, therefore, last longer because the holes in the crank arm are not worn due to constant movement of the pin, and also the holding nut for the pin is securely held so that there is no relative movement between the pin and the crank arm.

Having described my invention, I claim:

1. A locked wrist pin for oil well pump apparatus comprising a trunnion adapted to receive the connecting rod, a plate on the trunnion, a circular pin section in alinement with the trunnion, a nut adapted to screw on the pin section, and a locking trunnion on the plate whereby the pin is held against rotation, and a lock plate adapted to fit over said nut, and means securing said lock plate to the locking trunnion.

2. A locked wrist pin adapted to be mounted on a crank arm for oil well pumping equipment comprising a trunnion upon which the connecting rod is journaled, a plate integral with said trunnion and adapted to bear against one side of the crank arm, a pin section extending through the crank arm, a nut screwed on to the pin section against the crank arm, and a locking trunnion on the plate extending through the crank arm, and a lock plate fitting over the nut, and means to secure said plate to the locking trunnion.

3. A locked wrist pin adapted to be mounted on a crank arm for oil well pumping equipment comprising a trunnion upon which the connecting rod is journaled, a plate integral with said trunnion and adapted to bear against one side of the crank arm, a pin section extending through the crank arm, a nut screwed on to the pin section against the crank arm, and a locking trunnion on the plate extending through the crank arm, and a lock plate fitting over the nut, and means to secure said plate to the locking trunnion, said means comprising a bolt extending through the trunnion, and a nut screwed on to the bolt against the lock plate.

In testimony whereof, I affix my signature.

RALPH R. WIRT.